(12) United States Patent
Litteaut et al.

(10) Patent No.: US 8,467,501 B2
(45) Date of Patent: Jun. 18, 2013

(54) METHOD FOR PLAYING A PERSONALIZED CLIP

(75) Inventors: Jacques Litteaut, Marly le Roi (FR); Stéphane Coulon, Arronville (FR)

(73) Assignee: Alcatel Lucent, Paris (FR)

( * ) Notice: Subject to any disclaimer, the term of this patent is extended or adjusted under 35 U.S.C. 154(b) by 2026 days.

(21) Appl. No.: 11/529,233

(22) Filed: Sep. 29, 2006

(65) Prior Publication Data

US 2007/0121922 A1 May 31, 2007

(30) Foreign Application Priority Data

Sep. 30, 2005 (EP) .................................. 05300788

(51) Int. Cl.
*H04M 1/64* (2006.01)
(52) U.S. Cl.
USPC ............................................. 379/76; 379/87
(58) Field of Classification Search
USPC .......................................... 379/88.22, 76, 87
See application file for complete search history.

(56) References Cited

U.S. PATENT DOCUMENTS

| | | | | |
|---|---|---|---|---|
| 5,493,606 A * | 2/1996 | Osder et al. | ................. | 379/88.05 |
| 5,915,001 A * | 6/1999 | Uppaluru | ................... | 379/88.22 |
| 5,918,213 A * | 6/1999 | Bernard et al. | ............ | 705/26.35 |
| 5,945,989 A * | 8/1999 | Freishtat et al. | .............. | 715/760 |
| 6,122,346 A * | 9/2000 | Grossman | ....................... | 379/68 |
| 6,161,128 A * | 12/2000 | Smyk | ........................... | 709/205 |
| 6,272,211 B1 * | 8/2001 | Hazenfield | .................... | 379/162 |
| 6,337,858 B1 * | 1/2002 | Petty et al. | .................... | 370/356 |
| 6,400,804 B1 * | 6/2002 | Bilder | .............................. | 379/76 |
| 6,731,609 B1 * | 5/2004 | Hirni et al. | .................... | 370/260 |
| 6,735,193 B1 * | 5/2004 | Bauer et al. | .................... | 370/352 |
| 6,751,306 B2 * | 6/2004 | Himmel et al. | .......... | 379/201.02 |
| 6,807,574 B1 * | 10/2004 | Partovi et al. | ................. | 709/224 |
| 6,842,767 B1 | 1/2005 | Partovi | | |
| 6,853,719 B2 * | 2/2005 | McCormack et al. | ... | 379/215.01 |
| 7,143,039 B1 * | 11/2006 | Stifelman et al. | ............. | 704/270 |
| 7,173,911 B1 * | 2/2007 | Sarkar et al. | ................. | 370/252 |
| 7,209,475 B1 * | 4/2007 | Shaffer et al. | ................. | 370/355 |
| 7,277,924 B1 * | 10/2007 | Wichmann et al. | .......... | 709/217 |
| 7,308,408 B1 * | 12/2007 | Stifelman et al. | ............. | 704/266 |
| 7,330,890 B1 * | 2/2008 | Partovi et al. | ................. | 709/224 |
| 7,339,940 B2 * | 3/2008 | Boberg et al. | ................. | 370/401 |

(Continued)

FOREIGN PATENT DOCUMENTS

EP 1 096 770 A2 5/2001

OTHER PUBLICATIONS

I. Dalgic et al, "Comparison of H.323 and SIP for IP Telephony Signaling", Proceedings of the SPIE, SPIE, Bellingham, VA, US, vol. 3845, 1999, pp. 106-122, XP000949839.

*Primary Examiner* — Simon Sing
(74) *Attorney, Agent, or Firm* — Harness, Dickey & Pierce, P.L.C.

(57) ABSTRACT

A method of playing a personalized clip offers a choice between a clip played locally by a device associated with a terminal of a calling party and a clip played remotely by a device associated with a terminal of a called party when the calling party's terminal is put on hold by the called party's terminal. It includes a step of interrogating the first terminal to determine if the clip must be played locally in the network to which the first terminal belongs or if the clip must be played remotely in the network to which the second terminal belongs.

10 Claims, 1 Drawing Sheet

U.S. PATENT DOCUMENTS

| | | | |
|---|---|---|---|
| 7,376,586 B1 * | 5/2008 | Partovi et al. | 705/26.43 |
| 7,376,740 B1 * | 5/2008 | Porter et al. | 709/227 |
| 7,403,605 B1 * | 7/2008 | Day | 379/162 |
| 7,421,504 B2 * | 9/2008 | Imaida et al. | 709/229 |
| 7,477,909 B2 * | 1/2009 | Roth | 455/466 |
| 7,512,114 B2 * | 3/2009 | Laturell | 370/352 |
| 7,552,054 B1 * | 6/2009 | Stifelman et al. | 704/270 |
| 7,571,226 B1 * | 8/2009 | Partovi et al. | 709/224 |
| 7,904,505 B2 * | 3/2011 | Rakers et al. | 709/203 |
| 7,908,383 B2 * | 3/2011 | Porter et al. | 709/227 |
| 7,941,481 B1 * | 5/2011 | Partovi et al. | 709/203 |
| 7,949,103 B2 * | 5/2011 | Sapp et al. | 379/68 |

* cited by examiner

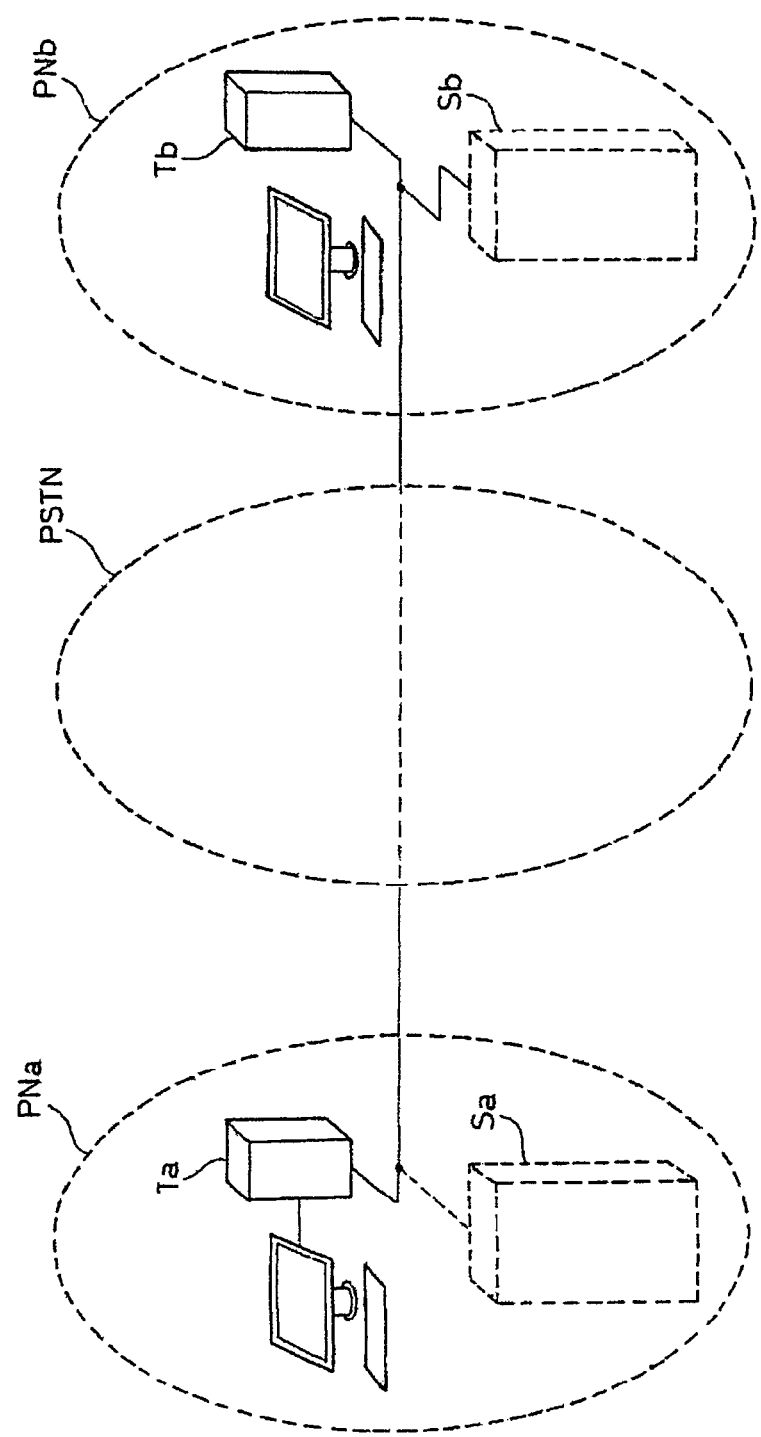

METHOD FOR PLAYING A PERSONALIZED CLIP

CROSS-REFERENCE TO RELATED APPLICATIONS

This application is based on French Patent Application No. EP05300788.6 filed Sep. 30, 2005, the disclosure of which is hereby incorporated by reference thereto in its entirety, and the priority of which is hereby claimed under 35 U.S.C. §119.

BACKGROUND OF THE INVENTION

1. Field of the Invention

The invention concerns a method for playing a personalized clip when a calling party is put on hold. This kind of clip is intended to encourage a user to be patient if he is put on hold when he calls another terminal that is busy with a call set up previously or if the user of the other terminal temporarily interrupts the call with the first terminal, for example to call a third terminal. A clip is conventionally a musical extract, but it may also be an advertising message or any other type of information. It may be a multimedia clip (audio, video, text), as multimedia terminals are beginning to be used to make calls.

2. Description of the Prior Art

It is desirable to adapt the content of a clip as a function of the person who receives it. For example, if the clip is to be an advertising message, it is desirable to select an advertisement for a product likely to interest the user who is on hold. One known method consists in identifying the calling party, insofar as this is possible. To some degree, the subscriber number of the calling terminal can identify the calling party, using a reverse directory. In fact, the subscriber number of the calling terminal is generally sent to the called terminal, unless the calling party has explicitly requested that it not be sent. However, the calling terminal may be used successively by several persons. Thus, it cannot reliably identify a person. On the other hand, if the same person can use more than one terminal, it must be possible to associate the name of that person with each of the numbers corresponding to the respective terminals.

U.S. Pat. No. 6,842,767 describes a voice portal that plays audio clips that can be adapted as a function of the telephone number of the calling terminal or as a function of a user profile previously stored in a table in association with the number of the calling terminal: the clip can therefore advertise a business situated in the geographical area corresponding to the first few digits of the number or the language of the clip may be selected as a function of that geographical area or as a function of a user profile. A user profile is constructed by putting questions to the user concerned or by observing the subjects that interest him.

When the calling party is an employee of a medium-size or large enterprise, encouraging him to be patient when put on hold by playing him a clip specific to that enterprise may be envisaged, the clip providing information on the enterprise or on the department in which the calling party works, instead of playing him a clip specific to the enterprise for which the called party works. This is another way of personalizing the clip that is played on hold.

European patent EP 1 096 770 describes a method including a step in which the called terminal causes the calling terminal to hear a holding audio signal without the called terminal (or its network) having to transmit that audio signal. That audio signal may be an audio signal predetermined by the calling party and produced locally in a private telecommunication network of the calling party, for example. This economizes on the transmission resources of the called network because it is sufficient to transmit a silence signal from the network of the called terminal to the calling terminal.

However, these known methods have the drawback of limiting the choices of the calling party to a single option: listening to an audio signal produced locally.

The object of the invention is to propose a method for personalizing a clip by enabling the calling party, or at least his terminal, to choose between a clip played locally by a device associated with the terminal of the calling party and a clip played remotely by a device associated with the terminal of the called party.

SUMMARY OF THE INVENTION

The invention consists in a method of playing a personalized clip when a first terminal is put on hold by a second terminal, which method includes a step of interrogating the first terminal to determine if the clip must be played locally in a network to which the first terminal belongs or if the clip must be played remotely in a network to which the second terminal belongs.

The invention also consists in a terminal for implementing the above method. It will become clear and its other features will become apparent in the light of the following description and the accompanying single FIGURE.

BRIEF DESCRIPTION OF THE DRAWING

The FIGURE shows one embodiment of the method of the invention.

DETAILED DESCRIPTION OF THE PREFERRED EMBODIMENT

A first user uses a terminal Ta belonging to a private network PNa for a video call with another user using a terminal Tb belonging to a private network PNb. These two private networks are typically enterprise networks. They are connected by a public telecommunication network PSTN. The terminals Ta and Tb are personal computers, for example, each including two loudspeakers, a microphone, a video camera and software for making video calls, in the conventional way. They further include software means for implementing the method according to the invention.

For example, the two users are communicating and, at a given moment, the user of the terminal Tb puts the user of the terminal Ta on hold by activating a function of the video communication software executed on the terminal Tb. The terminal Tb then sends to the terminal Ta a signaling message that informs it that this terminal Ta has been put on hold. The terminal Ta sends to the terminal Tb a signaling message that informs it of the holding mode to be applied for that terminal Tb, in order to personalize the clip that is played on hold. The user of the terminal Tb, or an administrator of the network PNa, has previously defined a holding mode by selecting one of the following three options:

1) a clip played locally by the terminal Ta of the user put on hold,
2) a clip played locally by a server Sa belonging to the same private network PNa as the terminal Ta,
3) a clip played remotely of the terminal Ta, i.e. played by the terminal Tb or by a server Sb of the network PNb of the terminal Tb.

Thus the clip is personalized: in the first case, it is a video clip chosen in line with the imagination of the user of the terminal Ta, in the second case, it is a clip chosen by the enterprise that employs the user of the terminal Ta, and in the third case it is a clip chosen by the enterprise that employs the user of the terminal Tb.

The mode of operation while on hold depends on the holding mode:

First Mode of Operation Corresponding to Option 1:

The terminal Ta plays a clip that is stored beforehand in the terminal Ta. It plays it until the terminal Tb sends to the terminal Ta a signaling message that informs it that this terminal Ta is again connected to the terminal Tb. The terminal Ta then stops playing the clip and sends to the terminal Tb a signaling message which informs it that playing of the clip has been interrupted. The call between the two terminals Ta and Tb resumes.

Second Mode of Operation Corresponding to Option 2:

The terminal Ta commands the server Sa to play a clip that was previously stored on the server Sa, this server Sa belonging to the network PNa, like the terminal Ta. This server So provides this clip player function for all the terminals of the private network PNa. This clip is played until the terminal Tb sends to the terminal Ta a signaling message which informs it that this terminal Ta is again connected to the terminal Tb. The terminal Ta then commands the server Ta to stop playing the clip and sends to the terminal Tb a signaling message which informs it that playing of the clip has been interrupted. The call between the two terminals Ta and Tb resumes.

Third Mode of Operation Corresponding to Option 3:

According to a first variant, the terminal Tb plays a clip that was previously stored in this terminal Tb. It plays until the user of the terminal Tb cancels the hold. The terminal Tb then sends to the terminal Ta a signaling message which informs it that the hold has been terminated. The terminal Ta is reconnected to the terminal Tb.

According to a second variant implementation, the terminal Tb commands the server Sb to play a clip that was stored previously in the server Sb, this server Sb belonging to the private network PNb, like the terminal Tb. This server Sb provides this clip player function for all the terminals of the private network PNb. This clip is played until the user of the terminal Tb cancels the hold. The terminal Tb then sends to the terminal Ta a signaling message which informs it that the hold has been terminated. The connection between the two terminals Ta and Tb is resumed.

An improvement to this third mode of operation consists in selecting a clip from a plurality of clips stored in the terminal Tb or in the server Sb, as a function of a user profile that is read in a table at an address corresponding to the identity of the user Ta. This enables personalization of the content of the clip, over and above the choice of the clip player. This table may be stored in the terminal Tb or the server Sb.

Operation is similar if the user of the terminal Ta is put on hold because the terminal Tb is already busy with another call at the time when the terminal Ta requests the setting up of a call.

To implement the first mode of operation, the terminal Ta includes software means for:

storing a predetermined option, to be applied when this terminal Ta is put on hold by another terminal such as Tb, this option possibly being that a clip must be played locally in this terminal Ta or that a clip must be played remotely in the network PNb of another terminal that is putting the terminal Ta concerned on hold;

receiving a message informing it that it has been put on hold;

responding to that message, indicating the predetermined option stored in this terminal Ta; and playing a clip locally in this terminal Ta if the predetermined option is that a clip must be played locally in this terminal Ta.

To implement the second mode of operation, the terminal Ta includes software means for:

storing a predetermined option to be applied when this terminal Ta is put on hold by another terminal such as Tb, this option possibly being that a clip must be played locally in the terminal Ta or that a clip must be played remotely in the network to which the other terminal that is putting the terminal Ta concerned on hold belongs;

receiving a message informing it that it has been put on hold;

responding to that message, indicating the predetermined option stored in this terminal Ta; and commanding the reading of a clip in a server Sa belonging to the same network as this terminal Ta if the predetermined option indicates that a clip must be played locally in the network PNa to which this terminal Ta belongs.

To implement the first variant of the third mode of operation, the terminal Tb includes software means for:

sending to another terminal, such as Ta, a message informing it that this other terminal Ta has been put on hold;

receiving a response indicating that a predetermined option stored in this other terminal Ta, to be applied when this terminal Ta is put on hold, which option can be that a clip must be played locally in this other terminal Ta, or that a clip must be played remotely, in the network to which the terminal Tb that is putting the terminal Ta concerned on hold belongs; and playing a clip in this terminal Tb if the predetermined option is that a clip must be played remotely in the network to which the terminal Tb that is putting the terminal Ta concerned on hold belongs.

To implement the second variant of the third mode of operation, the terminal of Tb includes software means for:

sending to another terminal, such as Ta, a message informing it that this other terminal To has been put on hold;

receiving a response indicating a predetermined option stored in this other terminal Ta to be applied if this terminal Ta is put on hold, which option may be that a clip must be played locally in this other terminal Ta or that a clip must be played remotely if this other terminal Ta is put on hold; and commanding the playing of a clip in a server Sb belonging to the same network as this terminal Tb if the predetermined option is that a clip must be played remotely in the network to which the terminal Tb that is putting the terminal Ta concerned on hold belongs.

The invention is also applicable to domestic telephone terminals using a signaling protocol such as SIP, ISDN or H323. If this kind of domestic terminal includes means for updating its software, it is then possible to install new software implementing the method of the invention.

There is claimed:

1. A method of playing a personalized clip when a first terminal is put on hold by a second terminal, the method comprising:

interrogating said first terminal to determine if said clip must be played locally in a network to which said first terminal belongs or if said clip must be played remotely in a network to which said second terminal belongs; and playing said clip according to the determination.

2. A method according to claim 1, further comprising:

interrogating said first terminal in order to determine if said clip must be played in said first terminal or if said clip must be played in a server belonging to said network to which said first terminal belongs, if said clip must be played locally in a network to which said first terminal belongs.

3. A method according to claim 1, wherein, if said clip must be played remotely in a network to which said second terminal belongs, said clip is played in said second terminal.

4. A method according to claim 1, wherein, if said clip must be played remotely in a network to which said second terminal belongs, said clip is played in a server belonging to said network to which said second terminal belongs.

5. A telecommunication terminal, configured to:
store an option to be applied if said terminal is put on hold by another terminal, the option indicating that a clip must be played locally in said terminal or that a clip must be played remotely in a network to which said other terminal that is putting the terminal concerned on hold belongs;
receive a message indicating to said terminal that it has been put on hold;
respond to said message, indicating the option stored in said terminal; and
play a clip in said terminal if said predetermined option is that a clip must be played locally in said terminal.

6. The telecommunication terminal of claim 5, further configured to play a clip in said terminal if said predetermined option is that a clip must be played locally in said terminal.

7. The telecommunication terminal of claim 5, further configured to command the playing of a clip in a server belonging to the same network as the terminal concerned if the option is that a clip must be played locally in the network to which the terminal concerned belongs.

8. A telecommunication terminal configured to:
send to another terminal a message informing it that this other terminal has been put on hold;
receive a response indicating a predetermined option stored in this other terminal to be applied if the other terminal is put on hold, the option indicating that a clip must be played locally in said other terminal or that a clip must be played remotely if said other terminal is put on hold; and
playing said clip according to the response.

9. The telecommunication terminal of claim 8, further configured to read a clip in the terminal concerned if said predetermined option is that a clip must be played remotely.

10. The telecommunication terminal of claim 8, further configured to command the playing of a clip in a server belonging to the same network as the terminal concerned if said option is that a clip must be played remotely.

* * * * *